United States Patent [19]

Garcia, Jr.

[11] 4,421,831
[45] Dec. 20, 1983

[54] BATTERY FLOW RESTRICTOR

[75] Inventor: Roger Garcia, Jr., Pittsfield, Mass.

[73] Assignee: General Electric Company, Schenectady, N.Y.

[21] Appl. No.: 397,087

[22] Filed: Jul. 12, 1982

[51] Int. Cl.³ ............................................. H01M 2/40
[52] U.S. Cl. ...................................... 429/70; 429/81; 429/210; 429/119
[58] Field of Search ................. 429/70, 81, 67-69, 429/210, 119

[56] References Cited

U.S. PATENT DOCUMENTS

| | | | |
|---|---|---|---|
| 2,706,213 | 4/1955 | Lucas | 429/70 |
| 2,988,587 | 6/1961 | Haring | 429/119 |
| 3,012,087 | 12/1961 | Van Billiard et al. | 429/119 X |
| 3,801,376 | 4/1974 | Lindstrom | 429/70 |
| 4,198,474 | 4/1980 | Shah | 429/119 |
| 4,218,521 | 8/1980 | Putt et al. | 429/70 X |
| 4,283,468 | 8/1981 | Goebel et al. | 429/81 |
| 4,329,406 | 5/1982 | Dahl et al. | 429/67 X |
| 4,383,008 | 5/1983 | Chi | 429/81 X |

*Primary Examiner*—Charles F. LeFevour
*Attorney, Agent, or Firm*—Francis K. Richwine

[57] ABSTRACT

An improved battery structure for a multicelled primary cell circulating electrolyte battery which provides for uniform distribution and rate of flow of the electrolyte to all of the cells. Batteries of this type include an intake raceway to conduct electrolyte along the edges of the cell plates to introduce the electrolyte to all of the cells. The invention contemplates the use of a flow restrictor in the form of a physical separator between the intake raceway and the cells which is interrupted by passages to permit a controlled flow of electrolyte to the cells. The passages are sized and located responsive to system parameters to provide a uniform flow and a predetermined pressure drop at the restrictor which is preferably of the order of ten times the pressure drop of the electrolyte through the cells.

10 Claims, 3 Drawing Figures

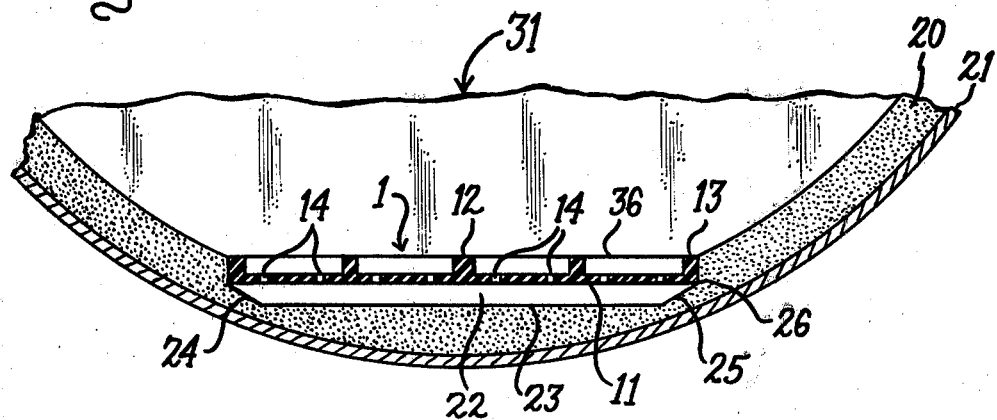
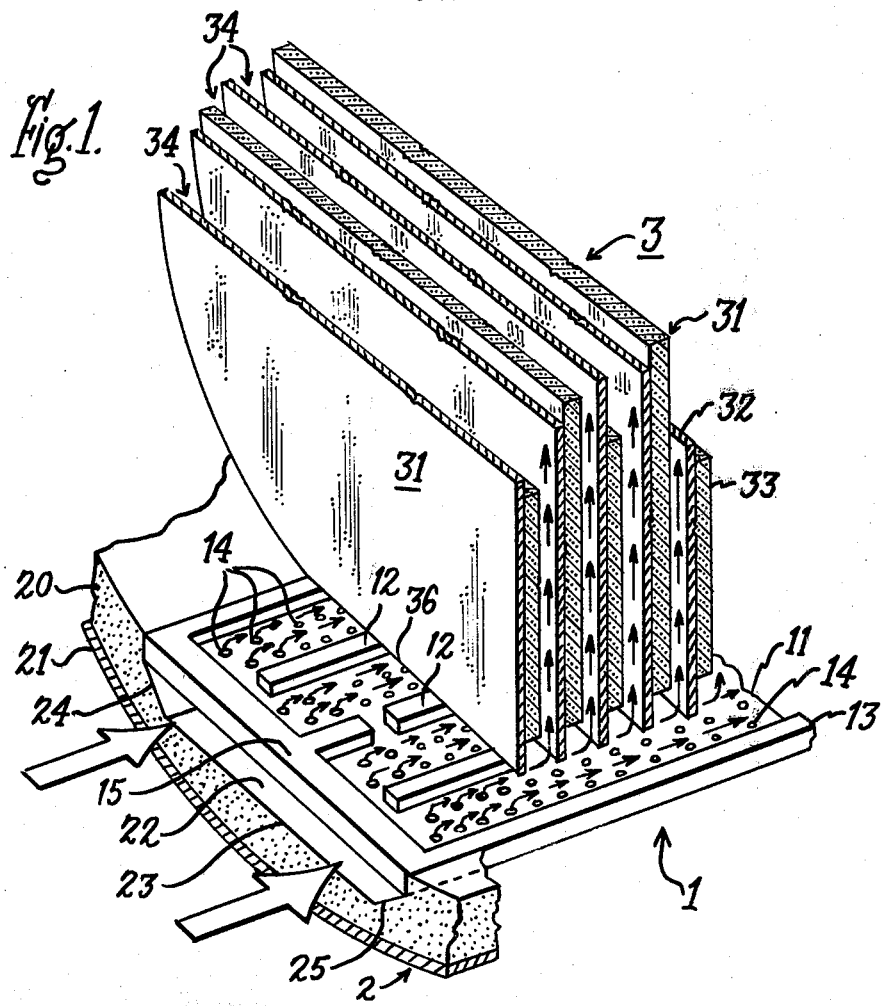

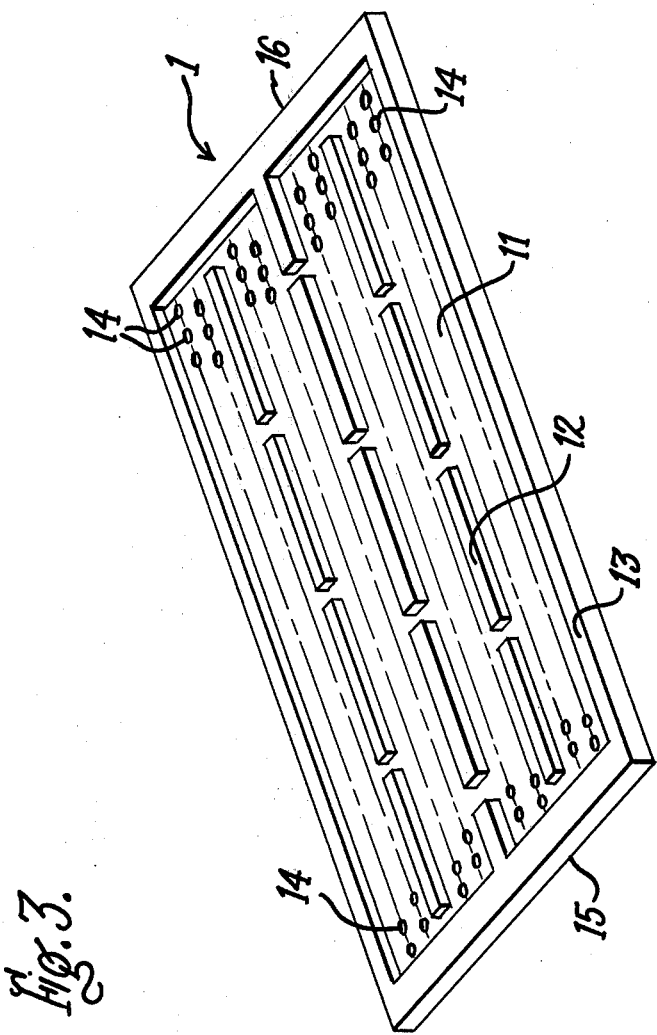

BATTERY FLOW RESTRICTOR

The Government has rights in this invention pursuant to Contract N00024-79-C-6276 awarded by the Department of the Navy.

BACKGROUND OF THE INVENTION

1. Field of the Invention

This invention pertains to structures for bipolar electrolytic cells and batteries and is pertinent to any primary batteries or other form of electrolytic cells which are water activated, use flowing electrolyte or both. Application would occur particularly in battery structures for high power uses in which a series or stack of plates, particularly a large number of bipolar plates having relatively narrow separations, is used with a flowing electrolyte. One specific application is in torpedo propulsion batteries which use a circulating electrolyte, e.g., seawater or an electrolyte from a reservoir.

2. Background Art

The U.S. patents to Mershon, U.S. Pat. No. 1,572,403; Lucas, U.S. Pat. No. 2,706,213; Haring, U.S. Pat. No. 2,988,587; Van Billiard et al., U.S. Pat. No. 3,012,087; and Shah, U.S. Pat. No. 4,198,474 represent background art in the field of circulating electrolyte batteries. Van Billiard discloses a seawater battery having electrolytic cells of magnesium and silver chloride wherein the battery pile structure, as shown in FIG. 2 of that patent, is made up of a series of plates each having a layer of magnesium and a layer of silver chloride separated by a sheet of silver foil. Contiguous plates are spaced apart by means of glass beads embedded into the silver chloride to permit free electrolyte flow between plates to constitute an electrolytic cell. Mershon and Lucas disclose primary cell systems in which an electrolyte is circulated continuously between closely stacked plates constituting the anode, cathode or both depending on the chemical nature of the particular electrolytic cell. Haring shows a battery (i.e., an assembled plurality of plates) structure suitable for use with a circulating electrolyte. Shah provides a primary cell battery having, in the terms of the abstract, "provision for uniformly distributing a desired concentration of the electrolyte for maximum power output" which includes flow control and directing means.

Additional information pertaining to an applicable class of cell is available in Chapter 7 (see FIG. 7.7, page 311) "Water Activated Batteries" by D. J. Doan in Volume II of "The Primary Battery," Cahoon and Heise, Editors, the Electro-mechanical Society, Inc., New York, Copyright 1976, John Wiley and Sons, Inc.

SUMMARY OF THE INVENTION

This invention pertains to the physical structure of primary bipolar electrolytic cells and batteries for high current density use and improved electrolyte management therefor and particularly as applicable to structures having a relatively high number of plates. Specifically, the improvement is directed to the use of mechanical means to provide uniform electrolyte flow through all cells of the battery to attain good electrolyte distribution, to preclude cell electrolyte starvation that could result from the exhaustion of the electrolyte in a particular area and also to permit a smaller raceway cross-sectional area as a way to reduce current leakage losses. These results can be accomplished by the insertion of a physical barrier in a battery between the intake raceway and the cell courses to equalize flow through the various cells by creating a pressure drop at the barrier which, in connection with a graduated flow rate pate the barrier, will equalize the flow through the various cells irrespective of the distance of the cell from the raceway intake.

BRIEF DESCRIPTION OF THE DRAWINGS

FIG. 1 is an illustration, partly in section, of a portion of a battery structure showing a flow restrictor according to this invention and its relationship to the battery container and the cells of the battery.

FIG. 2 is a partial cross section of a battery showing a flow restrictor according to this invention in cross section located between the inlet raceway and the cell area.

FIG. 3 is a perspective illustration of a flow restrictor for a primary battery in accordance with this invention.

DETAILED DESCRIPTION

General

Batteries to which a flow restrictor made in accordance with this invention is applicable are usually made up of a series or pile of plates or planar electrodes, quite often bipolar plates, held in compression in a face-to-face relationship either on the basis of the overall battery as, for example, illustrated in FIG. 2 of Haring or within individual cell structures or plates as illustrated in Shah. The assembled cell structure is then retained in a container, for example, as shown in Mershon or Lucas, with provisions for introduction and circulation of an electrolyte and may be configured to fit into a separate canister, for example, 25 of Haring, or merely within a body section of a torpedo, buoy or other body as depicted by Shah.

Although raceway shaping, for example, the management of the cross section configuration and relative area of the conduits conveying flowing electrolyte to and from the cell structures, has been used to provide uniform electrolyte flow through battery cells, the benefits of shaping decreases as the length of battery, and therefore the number of cells, increases. Additional cells and increased length of batteries with a requirement for a longer raceway has generally resulted in a larger raceway cross-sectional area which in turn permit larger current leakage losses in the raceway itself. For that reason, it is necessary to consider other means for obtaining a uniform electrolyte flow through the various cells and all portions of each cell to preclude regional stagnation and other uneven flow phenomena which would tend to cause exhaustion of some of the cells prior to the calculated battery life or other undesired results. The technique applied in this invention is the use of barrier structures to adjust pressure drops along a barrier to produce a balanced flow rate through the cells. It has also been found that the use of barriers or flow restrictors generally permit smaller raceway cross-sectional areas which reduce the current leakage losses through the electrolyte running in the raceway.

Present Invention

The present invention, which as noted contemplates the use of a physical barrier structure between the raceway and cell structure of a circulating electrolyte primary battery to control flow rates and pressure drops of the flowing electrolyte to produce a uniform flow through each of the cells irrespective of the number of the cells is implemented in the illustrated embodiment by means of a planar flow restrictor having aperatures for the flow of the electrolyte between the raceway and the cells which are graduated in size from smaller near the entrance to larger near the closed end of the intake raceway. The implementation illustrated is best described with reference of FIG. 1 which is a cutaway partial section of a perspective illustration of a primary cell battery structure wherein the reference number 1 is the flow restrictor located between the raceway in the battery casing structure 2 and the cell structure 3. The battery casing 2 which may be a separate casing or a portion of a vehicle body such as a torpedo or a buoy is shown as having a wall 20 covered by an exterior shell 21 which are both broken away for the purpose of illustration. This wall structure casing may be of any convenient shape and in the embodiment illustrated would constitute a battery cartridge for a torpedo. One possible implementation is through the use of a shell structure 21 which may be metallic or for electrical insulation, fiberglass or another composite material and an epoxy or thermal setting plastic wall material 20 which can facilitate construction and must be electrically non-conductive. The wall structure 20 contains a recessed portion 23 running the length of the battery to form an intake raceway 22 for electrolyte flow through the battery structure as further defined by side wall surfaces 24 and 25 which, as more clearly shown in FIG. 2, can be angled as illustrated or otherwise shaped to facilitate flow and reduce turbulence as the electrolyte flows through the raceway. Arrows are used in FIG. 1 to depict flow of an electrolyte as it moves through the system under a force created either by an external scoop in the case of a simple flow-through torpedo seawater battery or by pumps in a more sophisticated system which recirculates electrolyte through the battery from and to a reservoir or other electrolyte management components. The cell structure 3 in this illustration is made up of a plurality of bipolar plates 31 which may, for example, include both anode 32 and cathode 33 which would, depending on the particular type of primary cell used, constitute a combination such as aluminum and silver oxide for use with potassium hydroxide as an electrolyte or magnesium and silver chloride or magnesium and cupreous chloride for use with a salt solution electrolyte which could be seawater. As illustrated, the planar plates 31 are set in the battery normal to the direction of electrolyte flow in the raceway 22 and may be retained by means commonly used in batteries of this type which can include the combination of compression and separators, for example, as shown in the structure of Haring, or merely held in place by having edges embedded in or cemented to an epoxy potting material used as a wall structure such as that illustrated at 20. The critical parameter in primary cell batteries of this type is that the plate 31 are spaced very closely together, sometimes on the order of 0.020–0.030 inch separation and are in themselves very thin being possibly of the order of 0.04 inches. Because of the nature of these "one shot" primary cell batteries which exhaust themselves by chemical dissolution of one of the plate substances during the electrolytic action, it is particularly important that the electrolyte management be such that the chemical reaction takes place over all the surfaces of the plates uniformly to maximize both service life and current density which can be in the range of and in excess of six (6) amperes per square inch.

The flow restrictor 1 lies between the raceway 22 and the cell structure 3 and can be held in place by resting in a notched portion 26 of the wall structure and be retained there by edges 36 of the plates 31. The electrolyte flow from the reservoir to the cells in any system using this structure would be controlled by electrolyte passages through the flow restrictor 1 as determined in accordance with the concept of this invention. In the embodiment illustrated and as depicted in FIG. 3, the flow restrictor is made up of a sheet 11 of material which is impervious and resistant to the electrolyte to be used as well as a non-conductor and which preferably has sufficient rigidity to stay in place and not cause turbulence by fluctuations responsive to electrolyte flow movement. Thickened edges 13 and raised pallet portions 12 on the restrictor serve to space the plate edges 36 of the plates 31 from the surface of the planar portion 11 of the flow restrictor to permit electrolyte flow between the restrictor and the cells and, if required, to provide extra rigidity to the restrictor. The pallet portions also serve to canalize electrolyte flow between the flow restrictor and the cells in the direction of flow in the raceway forming, in effect, a manifold which precludes the necessity of having a set of holes for each cell and permitting flow equalization in the event of holes becoming plugged by foreign material.

Electrolyte flow through the flow restrictor 1 is controlled by the size and location of openings, aperatures or holes through the sheet portion 11 which, as illustrated, are represented by the holes 14 of which some are omitted from the drawings but are otherwise represented by the dashed lines showing the centerline of each row of holes. The holes vary in size along the length of the restrictor with those proximate the intake end 15 of the restrictor being smaller and those at the interior end 16 being larger with a graduation of size in between which is linear or non-linear as calculated to produce the desired flow. This arrangement provides less resistance to flow of electrolyte from the intake raceway into the cell structure at the interior or terminal end of the raceway than exists near the entrance to the raceway. The size of the holes or aperatures, both the absolute and the relative sizes, are critical in that both must be considered along with the electrolyte capacity of the cells and the raceway, system pressure and the desired electrolyte flow rate to obtain both a uniform flow rate through all of the cells and to have that flow rate meet the electrolyte dwell time parameters. Proper selection of those criteria will establish determinable pressure drops at various places in the systems and it has been found that uniform flow through all the cells can be obtained by having a relatively large pressure drop at the restrictor as compared to pressure drop through the cells—e.g., a pressure drop on the order of magnitude of ten times the drop through the cells themselves. Further, it appears that the higher the ratio of restrictor pressure drop to cell pressure drop, the more uniform the resulting flow distribution. Actual discharges of batteries containing from sixty (60) to as many as two hundred forty (240) cells were made using the restrictor of this disclosure. Examination of the used batteries confirmed that cell discharge was uniform over cell area and among cells.

Conclusions

Efficiencies and life of high current density multicelled primary batteries using flowing electrolyte are improved by providing a uniform electrolyte flow through various cells. Raceway shaping which has been used by others has worked reasonably well for batteries containing up to about sixty (60) cells but as the number of cells increase there is an accompanying increasingly larger cross-sectional area of raceway which creates larger current leakage losses in the raceway. Applicant has found that the difficulties using the known methods of raceway shaping are real practical difficulties for batteries containing more that about sixty (60) cells. By experimentation, i.e., measurement of test devices, and by mathematical calculations, Applicant has found that uniform flow distribution can be maintained in multi-celled batteries of this type having a very large number of cells by controlling electrolyte flow to produce a high ratio of electrolyte pressure drop in the inlet raceway just prior to flow of the electrolyte into the cells as compared to the pressure drop through the cells. It was also found that a ratio of pressure drop at the raceway-to-cell interface of the order of magnitude of ten times the pressure drop through the cells themselves will produce the desired uniformity of electrolyte flow rate in batteries containing as many as two hundred forty (240) cells. Applicant further found that the use of a physical barrier with passages such as the holes 14 of predetermined size relative to total flow rate and pressure drop and which vary in size depending on location in the raceway-to-cell interface can produce the desired result.

It is, therefore, concluded that the use of a restrictor as described in this Application, constitutes a practical implementation of the criteria and premises disclosed.

We claim:

1. In a bipolar primary battery having a multiplicity of closely spaced parallel battery plates defining a plurality of electrolytic cells, a casing surrounding the cells and channels in said casing for circulation of electrolyte to and from the cells and to and from other components of an electrolyte management system, the improvement wherein:

one said channel formed in said casing constitutes an intake raceway for conducting electrolyte past the edges of said plates in a direction relatively normal to said plates for delivery of electrolyte to all said cells; and a flow restrictor interposed between said raceway and said cells for controlling the flow of electrolyte from said raceway to said cells to provide for an equalized flow of electrolyte through all cells, said flow restrictor being primarily a barrier but having passages therethrough to permit a limited distributed flow of electrolyte and to cause a pressure drop, both as predetermined to equalize flow among said cells.

2. The improvement of claim 1 wherein:
said passages are varied in size as required to obtain the proper flow rate and pressure drop for the cells opposite to the particular passages.

3. The improvement of claim 2 wherein:
said restrictor is generally planar, forms one wall of said raceway and includes spacer portions projective from the surface on the cell side thereof to permit electrolyte to pass between the restrictor and the plates; and
said raceway is elongated, is formed by said restrictor and a portion of said casing, has an open intake end for receipt of electrolyte and has an internal closed end;
whereby electrolyte flowing into said raceway under pressure will flow through said passages into said cells.

4. The improvement of claim 3 wherein:
said passages through said restrictor are holes, the size and location of which are coordinated with the other parameters of the system including size and number of cells and the pressures and volumes of electrolyte to cause the pressure drop at the restrictor to approximate ten times the pressure drop that occurs in the cells.

5. The improvement of claim 4 wherein:
said holes are arranged in a plurality of spaced rows running along the length of said raceway; and
said holes are varied in size and arranged in generally graduated order from smaller holes proximate said intake end of said raceway to larger holes proximate said closed end.

6. A primary battery structure for use with a circulating electrolyte system comprising:
a series of closely-spaced electrode plates forming a plurality of electrolytic cells;
a battery casing surrounding and retaining said electrode plates and defining with selected edges of said plates channels for movement of electrolyte to and from said cells and to and from other components of an electrolyte management system, one said channel constituting an intake raceway running from an open intake end proximate one end of said battery past an edge of each electrode plate to a closed end proximate the other end of said battery;
a separator extending between said electrode plates and said intake raceway and constituting the boundary of said raceway proximate said cells, said separator creating a barrier for flow of electrolyte from said intake raceway to said cells; and
restricted passageways through said separator to permit, limit and distribute flow of electrolyte from said intake raceway to said cells;
whereby predetermined pressure drops, flow rates and flow patterns of electrolyte through said passageways can be established by selection of the size and location of said passageways so as to produce a uniform electrolyte flow through the plurality of cells.

7. The primary battery structure of claim 6 wherein:
said separator is generally planar and normal to said electrode plates, has raised portions on the cell side thereof bearing against the edges of at least some of said electrode plates to provide for flow of electrolyte between said separator and the proximate edges of said electrode plates; and
said separator is relatively rigid, is made of a material which is not a conductor of electricity and is impervious to the electrolyte and to the products of the electrolytic action in the cells.

8. The primary battery structure of claim 7 wherein:
said raceway is a trough in the interior wall of the battery casing and is covered by said separator;
said separator is a barrier plate;
said raised portions of said separator constitute individual pallets arranged in spaced rows parallel to the direction of electrolyte flow; and
said passageways are holes of a range of sizes through said barrier plate generally arranged in rows between said rows of pallets.

9. The primary battery structure of claim 8 wherein:

each said hole constituting a passageway through said barrier plate is of a predetermined size to provide for its location and responsive to system parameters of electrolyte quantity, pressure, flow rates and pressure drops the proper contribution to electrolyte flow and pressure drop at the barrier plate to obtain a uniform electrolyte flow through the plurality of cells; and said electrode plates are bipolar.

10. The primary battery structure of claim 9 wherein:
said holes are generally graduated in size from smaller holes at the intake end of said raceway to larger holes at said closed end of said raceway; and
the size of said holes produce a pressure drop of an order of magnitude in excess of the pressure drop through said cells.

* * * * *